United States Patent
Bigos, II

(10) Patent No.: US 9,757,667 B1
(45) Date of Patent: Sep. 12, 2017

(54) SYSTEM AND PROCESS FOR RECYCLING MACHINING WASTE FROM CNC EQUIPMENT

(71) Applicant: Donald Edward Bigos, II, Rochester, NH (US)

(72) Inventor: Donald Edward Bigos, II, Rochester, NH (US)

( * ) Notice: Subject to any disclaimer, the term of this patent is extended or adjusted under 35 U.S.C. 154(b) by 855 days.

(21) Appl. No.: 14/096,071

(22) Filed: Dec. 4, 2013

(51) Int. Cl.
  *B01D 17/00* (2006.01)
  *B01D 21/26* (2006.01)
  *B01J 19/12* (2006.01)

(52) U.S. Cl.
  CPC .......... *B01D 21/262* (2013.01); *B01J 19/123* (2013.01)

(58) Field of Classification Search
  CPC . F26B 5/041; F26B 17/20; F26B 3/02; C10G 31/00; C10G 33/00; C10G 1/045; C10G 31/06; B01D 17/00; B01D 17/0208; B01D 17/0214; B01D 17/10; B01D 2221/14; B01D 21/0012; B01D 21/2405; B01D 21/2444; C10M 175/00
  See application file for complete search history.

(56) References Cited

U.S. PATENT DOCUMENTS

| | | | | |
|---|---|---|---|---|
| 4,027,685 A * | 6/1977 | Heard | ................... | C10M 175/04 134/10 |
| 5,104,529 A * | 4/1992 | Becker | ............... | B01D 17/0202 210/195.1 |
| 5,244,586 A * | 9/1993 | Hawkins | ................ | B01D 36/02 210/314 |
| 5,830,369 A * | 11/1998 | Toyama | ................. | B28D 1/025 125/16.02 |
| 2006/0000787 A1 * | 1/2006 | Galasso, III | ........... | C10G 31/10 210/774 |
| 2016/0045841 A1 * | 2/2016 | Kaplan | ................ | B01J 19/0093 429/49 |

FOREIGN PATENT DOCUMENTS

DE  EP 0864636 A1 *  9/1998  ............. B01D 17/00
JP  2012040640 A  *  3/2012

OTHER PUBLICATIONS

EP 0864636 A1, Process and apparatus for treating cooling lubricants for machine tools or similar; Sep. 16, 1998. Translation, Laudani Giuseppe.*

* cited by examiner

*Primary Examiner* — Walter D Griffin
*Assistant Examiner* — Cameron Allen
(74) *Attorney, Agent, or Firm* — Davis & Bujold PLLC; Michael J. Bujold

(57) ABSTRACT

A system and process for recycling machining waste into a solid/scrap material component and a recyclable machining coolant. The system and process comprise collecting the waste machining waste and mechanically separating the machining waste into a solid/scrap material component and a machining waste liquid component. The machining waste liquid component is decanted to separate oils and solids from the recyclable machining coolant. The machine recyclable machining coolant is then filtered through at least a first filter and preferably a second, finer mesh filter. The recyclable machining coolant is then exposed to UV light to kill bacteria and microorganisms. Lastly, ultrapure water is added to dilute the recyclable machining coolant and form the recycled machining coolant. If desired, a virgin machining coolant can be added to the recycled machining coolant, to replenish any additive(s) stripped during the recycling process, prior to resale of the recycled machining coolant.

19 Claims, 4 Drawing Sheets

SYSTEM AND PROCESS FOR RECYCLING MACHINING WASTE FROM CNC EQUIPMENT

BACKGROUND OF THE INVENTION

Field of the Invention

The present invention relates to a recycling process and system for recycling machining waste into both recyclable scrap metal and recyclable machining coolant so as to facilitate complete recycling of substantially all the machining waste generated by conventional computer numerical control (CNC) machining equipment.

Description of Related Prior Art

A variety of recycling systems are currently known for recycling machining coolant which is typically used for both cooling and/or lubricating various machining tools that are utilized by conventional CNC machining equipment in a manufacturing plant or a machine shop, for example. Typically, each piece of CNC machining equipment, of a manufacturing plant or a machine shop, has a dedicated coolant recirculating system in which machining coolant is continuously supplied from a storage tank, during the machining operation, and used to cool the machining tool of the CNC machining equipment. The supplied machining coolant is then filtered and returned back to the storage tank for reuse. Periodically, the machining coolant may be checked to ensure that the machining coolant has a desired concentration and is still functioning properly in order to adequately cool and/or lubricate the various machining tools during the machining process.

During normal use, over time the machining coolant eventually becomes contaminated with various substances, e.g., due to contact of the machining coolant with the structure of the CNC machine, contact with the machining tool(s), contact with the workpiece which the machining coolant is cooling and/or lubricating, etc. These substances include, for example, particulate matter of various sizes, such as minute metal particles or shavings, larger metallic particles, shavings, debris, tramp oils, emulsifiers and/or other contaminants. To the extent possible, it is desirable to remove such contaminants from the machining coolant before the machining coolant can be turned back to the storage tank and subsequently be reused by the CNC machining equipment for cooling and/or lubricating a machining tool. Accordingly, such machining coolant is at least filtered, in a conventional manner, prior to being deposited in the storage tank for reuse by the CNC machining equipment.

The CNC machining equipment typically generates machining waste as a result of the conventional machining process of the CNC machining equipment. Such machining waste generated, as noted above, generally comprises minute metal particles or shavings, larger particles, shavings, debris, tramp oils, other contaminants and/or a small percentage of the emulsifiers/machining coolant. The generated machining waste is periodically disposed, e.g., on a daily basis for example. It is to be appreciated that such machining waste has some salvage value due to the inherent value of the metal particles contained within the machining waste. That is, such machining waste can be typically sold to a scrap metal dealer, for example. However, such scrap metal dealers generally prefer to only purchase machining waste, e.g., the scrap metal contained within the machining waste, in the event that the machining waste has a moisture content of 4% or less. It is to be appreciated that machining waste from a conventional CNC machining process, however, generally has a much higher moisture content, e.g., typically a moisture content of between 8%-20% or so, for example, and thus is somewhat more difficult to sell higher moisture content machining waste to a scrap metal dealer.

One known process for reducing the moisture content of the machining waste is to place such machining waste on top of a fine mesh screen or filter and allow gravity to assist with separating the salvageable machining coolant from the solid waste over time, e.g., typically a 24 hours time period is sufficient. While this procedure is somewhat effective in separating the machining coolant from the solid waste, gravity is only effective in reducing the moisture content, in the scrap material trapped by the fine mesh screen or filter, to comprise about 8% of the waste material. It is to be appreciated that a moisture content of about 8% is still generally too high for many scrap metal dealers and thus such high moisture content waste material is somewhat more difficult to recycle and/or tends to be less valuable.

In addition to the above, it is to be appreciated that many machining coolants comprise trade secret/proprietary formulations so that all of the actual components/constituents, forming the machining coolant, are not known. This consequentially hinders effective and efficient recycling of the machining coolant for subsequent reuse by an end user.

SUMMARY OF THE INVENTION

Wherefore, it is an object of the present invention to overcome the above mentioned shortcomings and drawbacks associated with the prior art.

It is another object of the present invention to provide a waste material recycling process which is highly effective in recycling (1) the scrap metal, (2) the machining coolant and (3) the tramp oil from the machining waste to thereby approach substantially 100% recycling thereof.

A further object of the present invention is to provide a system and process/method of recycling the machining waste so as to approach virtually one hundred percent recycling of all the constituents comprising the machining waste to thereby minimize the amount of material which has to be properly disposed of in a landfill, for example, and thus cannot be recycled.

Still another object of the present invention is to facilitate removing of approximately 98 to 99% of the machining coolant, from the recyclable scrap metal during a mechanical separation process, in order to increase the ability to sell the scrap material and also facilitate receiving a higher price for such recyclable scrap metal.

Yet another object of the present invention is to dilute the recycled machining coolant only with ultrapure water, e.g., water obtained from a reverse osmosis water process, so as to minimize, to the greatest extent possible, the amount of of any dissolved elements, minerals, compounds and other desired constituents which are added to the recycled machining coolant during the recycling/regeneration process.

A still further object of the present invention is to add a small quantity of virgin machining coolant, to the recycled machining coolant, in order to replenish any additive(s) which may have been inadvertently removed or stripped from the recycled machining coolant, during the recycling process, and thereby ensure that the recycled machining coolant maintains its original product specifications.

Another object of the present invention is to adequately, properly and thoroughly rinse and clean each piece of the recycling equipment, i.e., all flow conduits or pipes, all pumps, tanks, filters, etc., with ultra pure water prior to initiating the recycling process or a new machining process, in order to avoid any cross contamination of one machining coolant with another machining coolant, during the recycling process.

Still another object of the present invention is to resell and return a portion of the recycled machining coolant, back to the manufacturing plant or other machine shop or facility which initially generated the machining waste in the first place, and leave the manufacturing plant or other machine shop or facility with additional machining waste, which was generated by the manufacturing plant or other machine shop or facility, so as to facilitate efficient collection of the machining waste as well as efficient return of the recycled machining coolant.

A further object of the invention is to add only the desired additive(s) to the recycled machining coolant, which is conventionally present in the virgin machining coolant, without minimizing the addition of any other undesired dissolved element(s), compound(s), composition(s), etc., to the recycled machining coolant which may adversely effect the emulsifier(s) and/or other constituents or ingredients forming the machining coolant.

The present invention also relates to a process of recycling machining waste comprising both metal particles and a waste machining coolant into a recycled machining coolant, the process comprising the steps of: collecting the machining waste; mechanically separating the machining waste into a solid/scrap material component and a machining waste liquid component; decanting the machining waste liquid component to separate oils and solids from a recyclable machining coolant; filtering the recyclable machining coolant through at least a first filter; exposing the recyclable machining coolant to UV light to kill bacteria and microorganisms; and adding ultrapure water to dilute the recyclable machining coolant and form the recycled machining coolant.

The present invention also relates to a system of recycling machining waste, comprising both metal particles and a waste machining coolant, into a recycled machining coolant. The system comprises a collection mechanism for collecting machining waste; a mechanical separating apparatus, for receiving the machining waste from the collection mechanism, for mechanically separating the machining waste into a solid/scrap material component and a machining waste liquid component; decanting equipment for separating the machining waste liquid component, from the mechanically separating apparatus, into a recyclable machining coolant, solids and oils; a filtering mechanism, coupled to the decanting equipment, for filtering solids from the recyclable machining coolant; a UV lighting mechanism for exposing the recyclable machining coolant to UV light in order to kill bacteria and microorganisms contained therein; and a diluting mechanism for adding ultrapure water in order to dilute the recyclable machining coolant and form the recycled machining coolant.

As used herein and in the appended claims, the term "ultrapure water" refers to a source of water which contains less than 10 parts per million (ppm), and more preferably less than about 5 ppm, and most preferably less than 3 ppm of the each of the following minerals/compositions: calcium (Ca), magnesium (Mg), sodium (Na) and chloride (Cl). While there are a variety of processes/systems for obtaining ultrapure water, one suitable process comprises reverse osmosis water purification.

BRIEF DESCRIPTION OF THE DRAWINGS

The accompanying drawings, which are incorporated in and constitute a part of the specification, illustrate various embodiments of the invention and together with the general description of the invention given above and the detailed description of the drawings given below, serve to explain the principles of the invention. It is to be appreciated that the accompanying drawings are not necessarily to scale since the emphasis is instead placed on illustrating the principles of the invention. The invention will now be described, by way of example, with reference to the accompanying drawings in which.

DETAILED DESCRIPTION OF THE INVENTION

The present invention will be understood by reference to the following detailed description, which should be read in conjunction with the appended drawings. It is to be appreciated that the following detailed description of various embodiments is by way of example only and is not meant to limit, in any way, the scope of the present invention.

It is be appreciated that most machining coolants are either oil based coolants or water-based coolants, and the present invention is applicable to both types of machining coolants.

Figure 1:
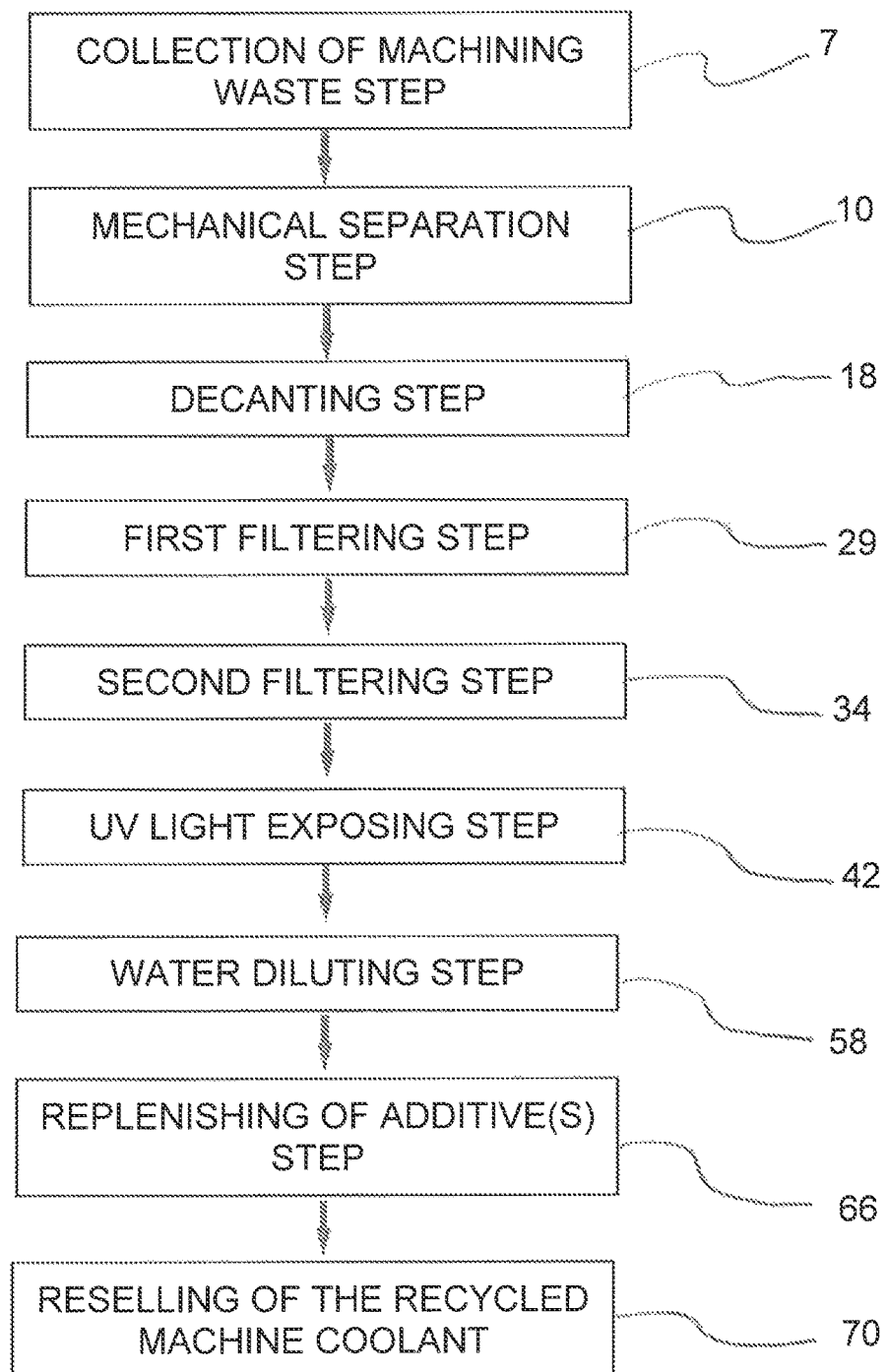
FIG. 1 is a diagrammatic view showing the steps comprising the process for recycling the machining waste, according to the present invention.
Figure 2:
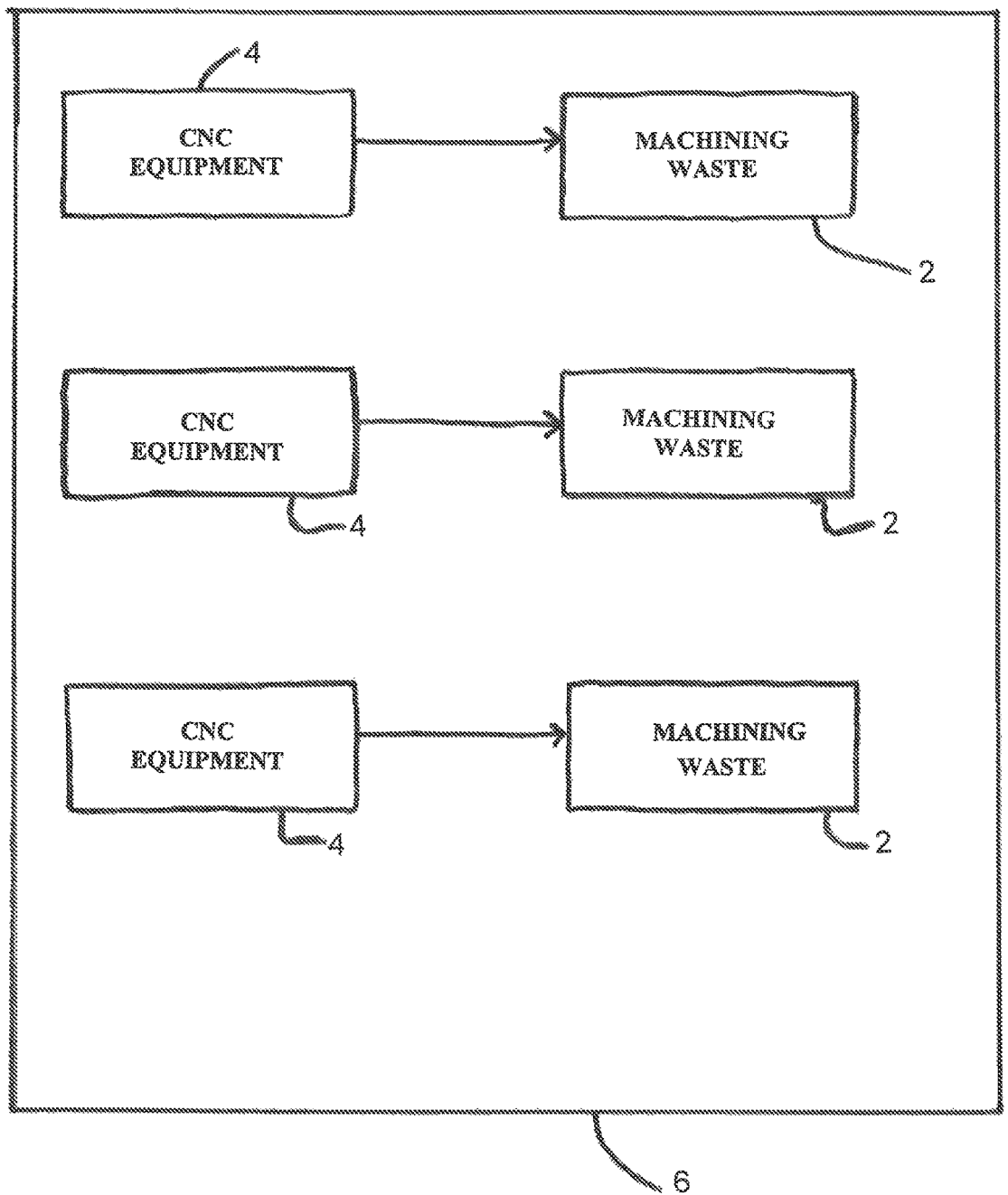
FIG. 2 is a diagrammatic drawing showing the initial generation of machining waste by conventional CNC equipment.

Turning now to FIGS. 1 and 2, a brief description concerning the various aspects and features of the present invention will now be briefly discussed. As diagrammatically shown in this figure, the machining waste 2 is generated by one or more CNC machining devices 4 located or contained at or within a manufacturing plant or other machine shop or facility 6. Such machining waste 2 is retrieved or pickup periodically, e.g., on a daily basis, a weekly basis, a biweekly basis, a monthly basis, during a collecting of machining waste step 7. Such retrieved machining waste 2 is then transported to the recycling facility 8 in a conventional manner.

Figure 3A:
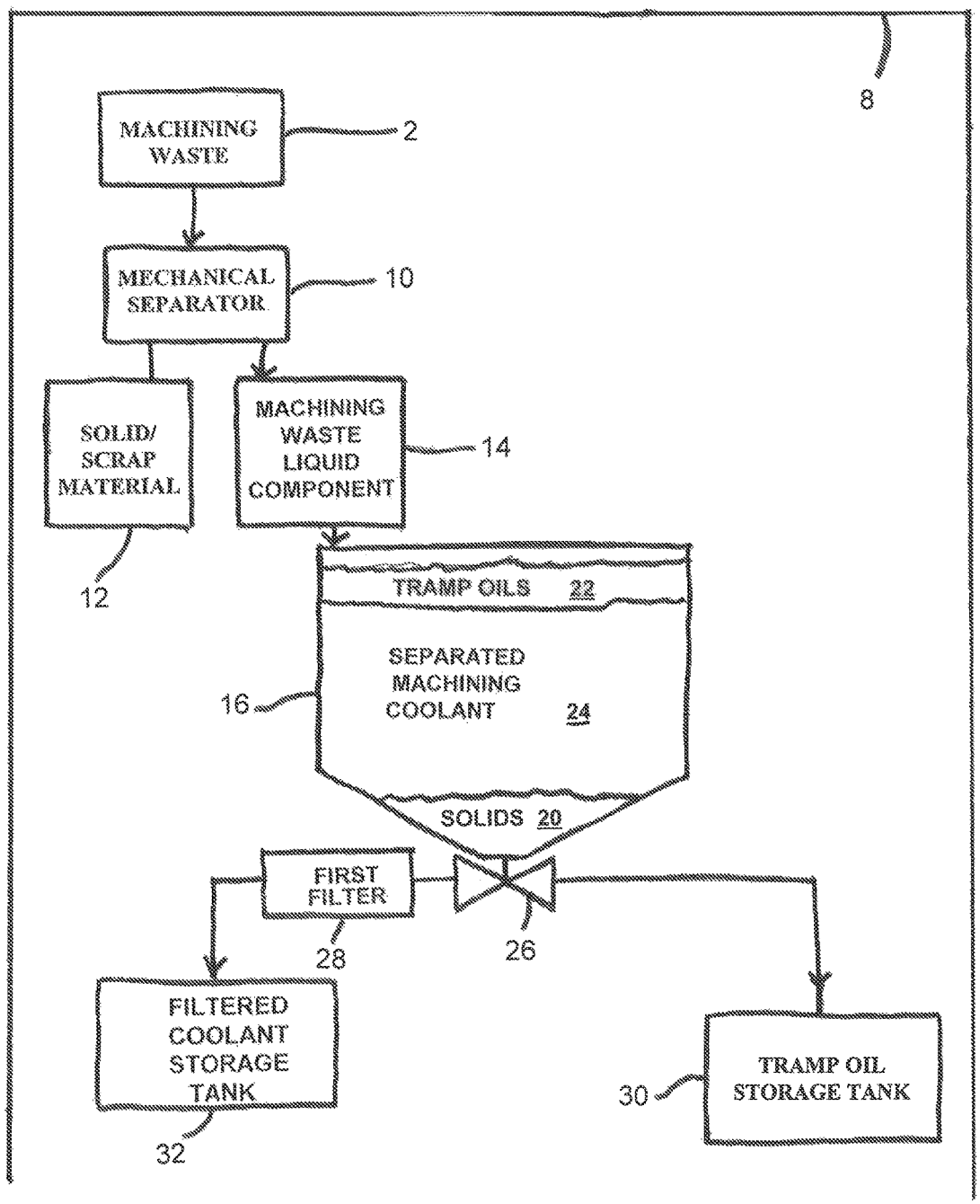
FIG. 3A is a diagrammatic drawing showing the mechanical separation, the decanting equipment and first filtering arrangement, according to the present invention.
Figure 3B:
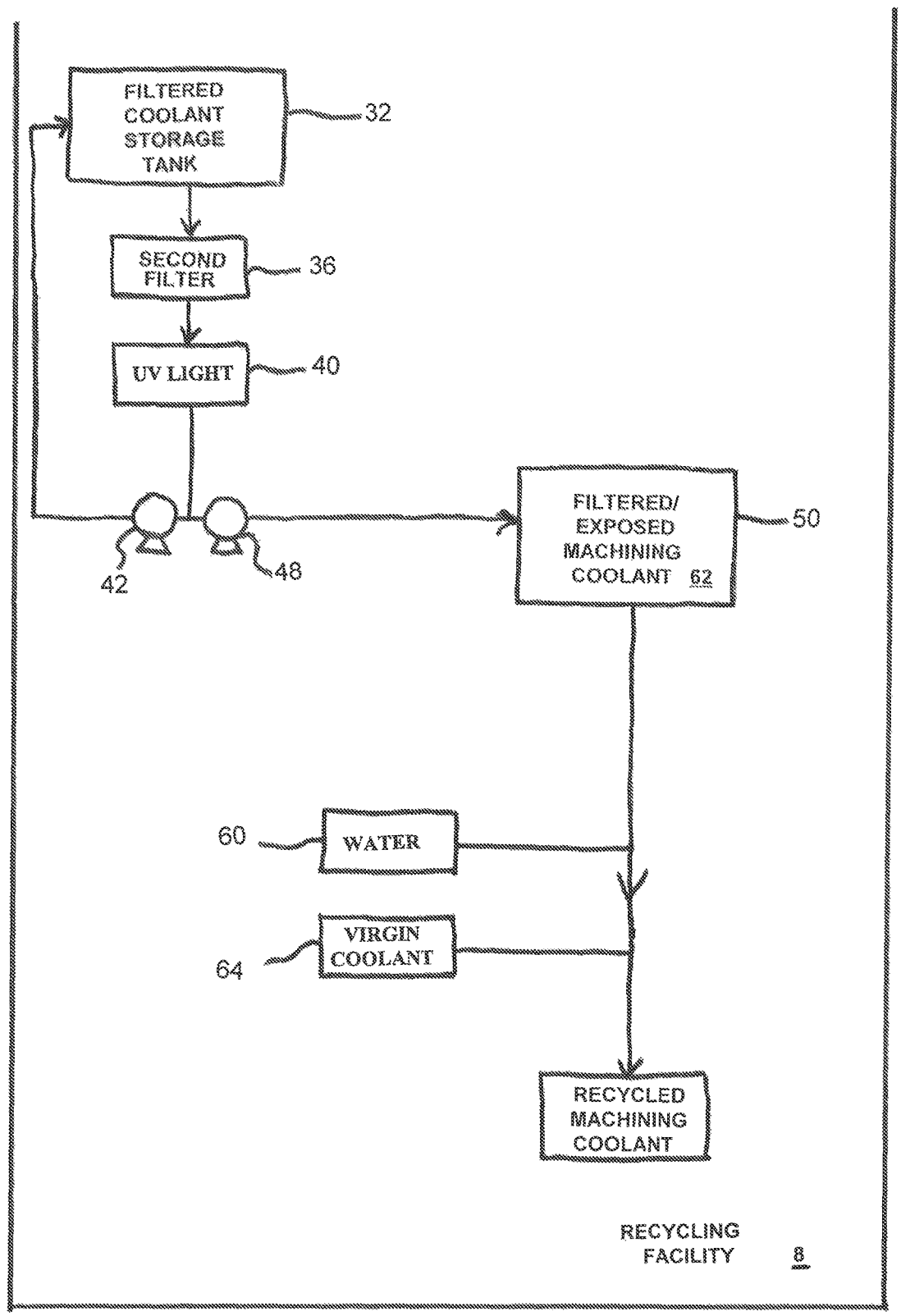
FIG. 3B is a diagrammatic drawing showing the second filtering process, the addition of the ultrapure water, and the addition of the virgin machining coolant for converting the recyclable machining coolant into the recycled machining coolant which is suitable for resale.

Turning now to FIGS. 1, 3A and 3B, a description concerning process and system for recycling the machining waste into a recycled machining coolant will now be provided. Once at the recycling facility 8, the machining waste 2 is first subjected to a mechanical separation step 10. The mechanical separation step generally comprises separating the collected machining waste 2 in either a conventional centrifuge 11 during which the machining coolant is spun at a relatively high rotational speed so as to mechanically expel and separate the machining coolant from the solids/scrap metal.

If a centrifuge is utilized for mechanically separating the machining coolant from the solids/scrap metal, the centrifuge typically rotates at a rotational speed of between 1,500 and 1,800 rpms for a duration of time of between 30 and 120 minutes. One suitable centrifuge for achieving the present invention is sold by Bazell Technologies Corporation of Concord, Calif. 94520 as product number G6F656. Alternatively, the machining waste may be mechanically separated from the solids/scrap metal by use of a "puck" press, also designated with reference numeral 11. If a "puck" press is utilized for mechanically separating the machining coolant from the solids/scrap metal, the a "puck" press is typically capable of providing between 25,000 and 45,000 pounds per square inch of pressure, more preferably about 35,000 pounds per square inch of pressure, to the mechanical waste for a duration of time of between 0.5 and 1.5 minutes. One suitable "puck" press is sold by Puck Master of Blaine, Minn. 55434 as product number 275.

After completion of the mechanical separation step 10, which comprises the first recycling step of the machining waste 2, the machining waste 2 is then segregated into two components, namely, a solid/scrap material component 12 and a machining waste liquid component 14. As a result of the mechanical separation step 10, the solid/scrap material component 12 typically has a moisture content between 1-2% and thus ready for sale to a scrap metal dealer without any subsequent processing thereof. In addition, since the moisture content is typically between 1-2%, typically a higher sales price can generally be asked and received for the solid/scrap material component 12.

The machining waste liquid component 14, from the mechanical separation step 10, is then collected and transferred into the decanting tank 16 where the machining waste liquid component 14 will then undergo a decanting step 18. During the decanting step 18, the machining waste liquid component 14 is transported and placed into the decanting tank 16 and allowed to become completely still and stagnant for a suitable duration of time, e.g., typically at least 12 hours, more preferably about 24 to 48 hours. During this decanting step 18, since the machining waste liquid component 14 is not circulated, all of the solids 20, contained within the machining waste liquid component 14, will gradually settle on the bottom of the decanting tank 16 while all of the tramp oils 22, and other lighter density fluids/oils, are gradually allowed to flow and migrate toward the top portion of the liquid contained within the decanting tank 16. The separated machining coolant 24, on the other hand, is permitted to gradually settle and be located between the solids 20, located on the bottom of the decanting tank 16, and the tramp oils 22 which float toward the top of the decanting tank 16.

Once the machining waste liquid component 14 has been allowed to settle for a sufficient duration of time, and gradually separate into at least three components, namely, the solids 20, the tramp oils 22 and other lighter density fluids/oils, and the separated machining coolant 24, the machining waste liquid component 14 is ready for subsequent processing. A valve 26, located at the bottom of the decanting tank 16, is then gradually moved from a closed position into a first flow position which allows the solids 20 and the separated machining coolant 24 to gradually flow through the valve 26, without creating any significant turbulence within the decanting tank 16, toward a first filter 28, e.g., a 50μ filter "bag filter." This first filter 28 is sized to permit only the separated machining coolant 24 to pass therethrough while trapping and preventing all of the larger solid particles and other particulate matter, e.g., the solids 20, from passing through the first filter 28. Once substantially all of the solids 20 and the separated machining coolant 24 is adequately drained from the decanting tank 16 (e.g., typically a small portion of the machining waste liquid component 14 will still remain in the decanting tank 16 after completion of the first filtering step 29).

Next, the valve 26 is moved to its closed position before any of the tramp oils 22 and other lighter density fluids/oils are allowed to flow out through the valve 26 and out of the decanting tank 16. The valve 26 is then moved into a second flow position in which the tramp oils 22, and other lighter density fluids/oils, are allowed to flow through the valve 26 and into a tramp oil storage tank 30 where the tramp oils 22 and other lighter density fluids/oils are allowed to collect and accumulate. Typically the tramp oils 22 and other lighter density fluids/oils typically comprise about 3% of the machining waste liquid component 14. Once a sufficient amount of the tramp oils 22 and other lighter density fluids/oils have collected and accumulated within the tramp oil storage tank 30, such tramp oils 22, and other lighter density fluids/oils, can be either transported to another tank of further storage and/or sold to a tramp oil recycling facility where such tramp oils 22, and other lighter density fluids/oils, can be recycled. As such tramp oils 22, and other lighter density fluid/oil recycling process is conventional and well known in the art, and does not from any part of the present invention per se, a further detailed discussion concerning the same is not provided.

The separated machining coolant 24, on the other hand, is then transferred to a filtered machining coolant storage tank 32 for subsequent processing, as discussed in further detail below. The filtered solids 20 and other particulate matter are then periodically collected and suitably disposed of in a conventional manner, e.g., transported to a landfill or otherwise properly disposed of.

The separated machining coolant 24 is then subjected to a second filtering process step 34 in which the separated machining coolant 24 is then passed through a finer second filter 36, e.g., 20μ filter for example, which facilitates removing any remaining small particulate matter and/or minute debris or other solid contaminants from the separated machining coolant 24. During this second filtering process step 34, the separated machining coolant 24 is typically repeatedly passed through the second filter 36 a number of times to insure a complete removal of all of small particulate matter and debris from the recyclable machining coolant 24.

Preferably, while the recyclable machining coolant 24 is undergoing the second filtering process step 34, the recyclable machining coolant 24 is also typically exposed to a source of UV light 40, during a UV exposure step 42. Such UV light 40 is highly effective in killing any bacteria and/or other microorganisms which may be contained within the recyclable machining coolant 24. It is to be appreciated that while the UV exposure step 42 is described as occurring substantially contemporaneously with the second filtering process step 34, if required or desired, the UV exposure step 42 may be a completely separate step which occurs either before the second filtering process step 34 or after the second filtering process step 34, without departing from the spirit and scope of the present invention. The important aspect is that the recyclable machining coolant 24 be sufficiently free of any bacteria and/or other microorganisms upon completion of the recycling process. A first pump 44 facilitates returning the recyclable machining coolant 24 back to the filtered machining coolant storage tank 32 for further filtration and UV exposure.

Following completion of the second filtering process step 34, the filtered and UV exposed recyclable machining coolant is then transferred, via a second pump 48, to a filtered/exposed machining coolant storage tank 50 where the filtered/exposed machining coolant 62 is allowed to accumulate and collect for subsequent processing and eventual resale. It is to be appreciated that the filtered/exposed machining coolant 62, at this stage, typically has a higher concentration then the machining coolant when it was initially sold by the machining coolant manufacture (e.g., it is typically between 50-100% more concentrated than the original machining coolant), but is still generally suitable for reuse as a machining coolant in CNC machining equipment. The primary reason that the filtered/exposed machining coolant 62, at this stage, typically has a higher concentration is that most machining coolants contain water, as one of its constituents, and the water typically evaporates during use of the machining coolant so that, over time, the concentration of the machining coolant gradually and slowly increases. Accordingly, typically before such recycled machining coolant can be resold back to the manufacturing plant or a machine shop or facility which generated the machining waste, for example, and reused in CNC machining equipment, such recycled machining coolant generally must be diluted back to the original concentration of the machining coolant.

During a water diluting step 58, a desired amount of water 60 is added to the filtered/exposed machining coolant 62. Depending upon the concentration of to the filtered/exposed machining coolant 62, the water 60 is typically added to the filtered/exposed machining coolant 62 at a water to coolant ratio of between 1:1 to 1:2. It is to be appreciated that it is important to use an ultrapure water source, as the water 60, when the diluting the filtered/exposed machining coolant 62. That is, it is to be appreciated that conventional tapwater and well water, and other conventional water supply sources (even to distilled water), typically have an unacceptably high amount of dissolved minerals and other components contain therein. Such dissolved minerals and other components, if not removed, gradually accumulate within the machining coolant and have a tendency to break down the emulsifier which comprises part of the filtered/exposed machining coolant 62. In the event that the emulsifier sufficiently breakdowns, then typically the filtered/exposed machining coolant 62 is deemed unacceptable for recycling purposes and must be properly disposed of. Accordingly, it is important that only ultrapure water 60, e.g., water which has a mineral content of calcium (Ca), magnesium (Mg), sodium (Na) and chloride (Cl) which is less than 10 ppm, more preferably less than 5 ppm, and most preferably less than 3 ppm, is only utilized to dilute the filtered/exposed machining coolant 62. This ensures that the machining coolant can be recycled virtually indefinitely before the dissolved minerals and other components sufficiently accumulate within the machining coolant and eventually lead to breakdown of the emulsifier(s).

In order to reduce the amount of minerals and other dissolved constituents which are added to the filtered/exposed machining coolant 62, only ultrapure water, such as reverse osmosis water (ROW), is utilized as water during the diluting step 58 for diluting the filtered/exposed machining coolant 62. This minimizes the possibility of the water, which is added to the filtered/exposed machining coolant 62, containing undesired dissolved minerals and other components which may hinder or detract from the effectiveness of the emulsification forming part of the machining coolant.

In addition, in order to replenish any additive(s) that may have been inadvertently stripped or removed from the filtered/exposed machining coolant 62 during the collection and/or recycling process, typically about 2 to 15% by volume, and more preferably about 5-10% by volume virgin machining coolant 64, obtained directly from the original manufacture of the machining coolant, is added to the filtered/exposed machining coolant 62 during a replenishing additive(s) step 66. The addition of the virgin machining coolant 64 to the filtered/exposed machining coolant 62 ensures that the final recycled machining coolant 70 generally meets the product specification of the original manufacturer of the virgin machining coolant thereby rendering such recycled machining coolant acceptable virtually any end-user.

Prior to resale, the concentration of the recycled machining coolant 70 is checked, the pH of the recycled machining coolant 70 is checked and the recycled machining coolant 70 is also verified to ensure that it is substantially free of any bacteria and/or other microorganisms. If necessary, the recycled machining coolant 70 can be further processed to ensure that the recycled machining coolant 70 is free of any bacteria and/or other microorganisms and the pH and solids concentration are acceptable. On this procedure, the recycled machining coolant 70 is now acceptable for resale during the step of reselling 72 the recycled machining coolant 70.

Generally, reverse osmosis (RO) is a water purification technology that uses a semipermeable membrane. This membrane-technology is not properly a filtration method. During reverse osmosis, an applied pressure is used to overcome osmotic pressure, a colligative property, that is driven by chemical potential, a thermodynamic parameter. Reverse osmosis can remove many types of molecules and ions from solutions and is used in both industrial processes and in producing potable water. The result is that the solute is retained on the pressurized side of the membrane and the pure solvent is allowed to pass to the other side. To be "selective," this membrane should not allow large molecules or ions through the pores (holes), but should allow smaller components of the solution (such as the solvent) to pass freely.

During the normal osmosis process, the solvent naturally moves from an area of low solute concentration (High Water Potential), through a membrane, to an area of high solute concentration (Low Water Potential). The movement of a pure solvent is driven to reduce the free energy of the system by equalizing solute concentrations on each side of a membrane, generating osmotic pressure. Applying an external pressure to reverse the natural flow of pure solvent, thus, is reverse osmosis. The process is similar to other membrane technology applications. However, there are key differences between reverse osmosis and filtration. The predominant removal mechanism in membrane filtration is straining, or size exclusion, so the process can theoretically achieve perfect exclusion of particles regardless of operational parameters such as influent pressure and concentration. Moreover, reverse osmosis involves a diffusive mechanism so that separation efficiency is dependent on solute concentration, pressure, and water flux rate.

Total Dissolved Solids (TDS) are the total weight of all solids that are dissolved in a given volume of water, expressed in units of mg per unit volume of water (mg/L), also referred to as parts per million (PPM). "Dissolved solids" refer to any minerals, salts, metals, cations or anions dissolved in water. This includes anything present in water other than the pure water ($H_2O$) molecule and suspended solids. It is to be appreciated that water may also pick up dissolved metals, such as lead or copper, as the water travels through pipes used to distribute water.

In the above description and appended drawings, it is to be appreciated that only the terms "consisting of" and "consisting only of" are to be construed in the limitative sense while of all other terms are to be construed as being open-ended and given the broadest possible meaning.

While various embodiments of the present invention have been described in detail, it is apparent that various modifications and alterations of those embodiments will occur to and be readily apparent those skilled in the art. However, it is to be expressly understood that such modifications and alterations are within the scope and spirit of the present invention, as set forth in the appended claims. Further, the invention(s) described herein is capable of other embodiments and of being practiced or of being carried out in various other related ways. In addition, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items.

Wherefore, I claim:

1. A process of recycling machining waste comprising both metal particles and a waste machining coolant into a recycled machining coolant, the process comprising:
   collecting the machining waste;
   mechanically separating the machining waste into a solid/scrap material component and a machining waste liquid component;
   decanting the machining waste liquid component, in a decanting tank, to separate a recyclable machining coolant from (1) tramp oils and other lighter density fluids/oils and (2) solids;
   filtering the recyclable machining coolant through at least a first filter to separate recyclable machining coolant from the solids;
   exposing the recyclable machining coolant to UV light to kill any bacteria and microorganisms contained within the recyclable machining coolant;
   adding ultrapure water to dilute the recyclable machining coolant and thereby form the recycled machining coolant; and
   collecting the tramp oils and other lighter density fluids/oils and recycling the tramp oils and other lighter density fluids/oils.

2. The process according to claim 1, further comprising adding virgin machining coolant to the recyclable machining coolant in order to replenish any additive stripped from the machining coolant during the process of recycling the machining waste.

3. The process according to claim 2, further comprising adding between 2-15% by volume of virgin machining coolant, to the recyclable machining coolant, in order to replenish any additive removed from the recyclable machining coolant during the process of recycling the machining waste.

4. The process according to claim 2, further comprising adding between 5-10% by volume of virgin machining coolant, to the recyclable machining coolant, in order to replenish any additive removed from the recyclable machining coolant during the process of recycling the machining waste.

5. The process according to claim 1, further comprising mechanically separating the machining waste into the solid/scrap material component and the machining waste liquid component by using a centrifuge.

6. The process according to claim 5, further comprising rotating the centrifuge at a rotational speed of between 1,500 and 1,800 rpms for a duration of between 30 and 120 minutes.

7. The process according to claim 1, further comprising mechanically separating the collected machining waste into the solid/scrap material component and the machining waste liquid component by using a press.

8. The process according to claim 7, further comprising pressing the collected machining waste, via the press, with a pressure of between 25,000 and 45,000 pounds per square inch and for a duration of time of between 0.5 and 1.5 minutes.

9. The process according to claim 1, wherein the step of filtering the recyclable machining coolant through at least the first filter further comprises passing the decanting machining waste liquid component through the first filter, having a mesh size of about 50µ, to remove solid material from the recyclable machining coolant.

10. The process according to claim 9, further comprising passing the recyclable machining coolant through a second filter, having a mesh size of approximately 20µ, to remove any small particulate matter, minute debris or other solid contaminants from the recyclable machining coolant.

11. The process according to claim 1, further comprising using reverse osmosis water as the ultrapure water which is added to dilute the recyclable machining coolant and form the recycled machining coolant.

12. The process according to claim 11, further comprising using ultrapure water which contains less than 5 ppm of the each of the following: calcium (Ca), magnesium (Mg), sodium (Na) and chloride (Cl).

13. The process according to claim 1, further comprising, after mechanically separating the machining waste into the solid/scrap material component and the machining waste liquid component, segregating the solid/scrap material component, which has a moisture content of between 1-2%, from the machining waste liquid component, and selling the solid/scrap material component to a scrap metal dealer without any subsequent processing thereof.

14. The process according to claim 1, further comprising sizing the first filter so as to permit only the recyclable machining coolant to pass therethrough while preventing and trapping the solids from passing through the first filter.

15. The process according to claim 1, further comprising, once the recyclable machining coolant is removed from the decanting tank, removing and storing the unwanted oils in an oil storage tank for collection and accumulation.

16. The process according to claim 1, further comprising only adding ultrapure water which has a mineral content of less than 10 ppm to the recyclable machining coolant.

17. A process of recycling machining waste comprising both metal particles and a waste machining coolant into a recycled machining coolant, the process comprising:
   collecting the machining waste;
   mechanically separating the machining waste into a solid/scrap material component and a machining waste liquid component;
   decanting the machining waste liquid component, in a decanting tank, to separate a recyclable machining coolant from (1) tramp oils and other lighter density fluids/oils and (2) solids by allowing the machining waste liquid component to become still for duration of time of at least 12 hours so that solids, contained within the machining waste liquid component, settle on a bottom of the decanting tank while the tramp oils and other lighter density fluids/oils float to a top portion of the machining waste liquid component contained within the decanting tank;
   filtering the recyclable machining coolant through at least a first filter to separate recyclable machining coolant from the solids;

exposing the recyclable machining coolant to UV light to kill any bacteria and microorganisms contained within the recyclable machining coolant; and adding ultrapure water to dilute the recyclable machining coolant and thereby form the recycled machining coolant.

18. The process according to claim 13, the step of decanting the machining waste liquid component to separate oils and solids from a recyclable machining coolant further comprises allowing the machining waste liquid component to become still and for duration of time of at least 24 hours so that solids, contained within the machining waste liquid component, settle on a bottom of the decanting tank while tramp oils and other lighter density fluids/oils float to a top portion of the machining waste liquid component contained within the decanting tank.

19. The process according to claim 13, comprising, once the solids settle on the bottom of the decanting tank, the tramp oils and other lighter density fluids/oils float to the top portion of the machining waste liquid component contained within the decanting tank, and the recyclable machining coolant is located therebetween, permitting the recyclable machining coolant to flow through the first filter while preventing the tramp oils and other lighter density fluids/oils from passing through the first filter.

* * * * *